US012770076B2

(12) United States Patent
Wisney et al.

(10) Patent No.: US 12,770,076 B2
(45) Date of Patent: Oct. 20, 2026

(54) SYSTEMS AND METHODS FOR PERFORMING INTEGRATION PROCESSES OF NEW APPLICATIONS USED IN AN ORGANIZATION

(71) Applicant: Recolabs Ltd., Tel Aviv (IL)

(72) Inventors: Gilad Wisney, Ma'or (IL); Tal Shapira, Tel-Aviv (IL); Michael Shnaiderman, Tel-Aviv (IL); Nir Barak, Tel-Aviv (IL)

(73) Assignee: Recolabs LTD, Tel Aviv (IL)

( * ) Notice: Subject to any disclaimer, the term of this patent is extended or adjusted under 35 U.S.C. 154(b) by 0 days.

(21) Appl. No.: 18/772,178

(22) Filed: Jul. 14, 2024

(65) Prior Publication Data

US 2026/0017581 A1 Jan. 15, 2026

(51) Int. Cl.
*G06Q 10/06* (2023.01)
*G06Q 10/0631* (2023.01)

(52) U.S. Cl.
CPC .............................. *G06Q 10/06312* (2013.01)

(58) Field of Classification Search
CPC ...................................................... G06Q 10/06
See application file for complete search history.

(56) References Cited

U.S. PATENT DOCUMENTS

2003/0191795 A1* 10/2003 Bernardin ............... G06F 9/505 709/201
2005/0262190 A1* 11/2005 Mamou .................. G06Q 10/10 709/203
2008/0209022 A1* 8/2008 Swank .................... H04L 67/14 709/223
2008/0256204 A1* 10/2008 Kamat .................. H04L 51/224 709/206
2010/0287280 A1* 11/2010 Sivan .................... G06F 9/5072 718/104
2019/0199693 A1* 6/2019 Vityaz ....................... G06F 9/48
2021/0133179 A1* 5/2021 Lee ........................ G06F 9/4881
2022/0342847 A1* 10/2022 Singh .................... G06F 16/128

FOREIGN PATENT DOCUMENTS

CA 2309052 C * 9/2009 ............. G06F 19/00
CA 2388624 C * 7/2011 ............... G06F 8/20
CA 2622835 C * 8/2011 ............. G06F 9/546
CA 2626043 C * 4/2012 ........... H04L 12/587
WO WO-2006026673 A2 * 3/2006 ............. G06F 17/00

OTHER PUBLICATIONS

Maitreyee Chaliha et al., Oracle Database Advanced Queuing User's Guide, Oracle and/or its affiliates, Copyright © 1996, 2018. (Year: 2018).*

* cited by examiner

*Primary Examiner* — Kurtis Gills
(74) *Attorney, Agent, or Firm* — PEARL COHEN LLP

(57) ABSTRACT

A method for integrating an organization into a computer application by generating jobs to request data from the application servers according to an integration plan for the computer application, assigning queue IDs to jobs required to be performed as part of the integration plan, where each queue ID of the queue IDs is associated with multiple jobs that share a limitation of the application's servers executing the jobs at the relevant queue, executing the jobs in the integration plan in queues according to the queue IDs, and updating jobs to a time-dependent list, where the update includes adding and removing jobs.

8 Claims, 4 Drawing Sheets

SYSTEMS AND METHODS FOR PERFORMING INTEGRATION PROCESSES OF NEW APPLICATIONS USED IN AN ORGANIZATION

FIELD AND BACKGROUND

The invention, in some embodiments thereof, relates to applications operating in organizations and, more specifically, but not exclusively, to systems and methods for integrating new applications used by entities of organizations.

Enterprises use internet-based services, such as Office365, Box, Salesforce, Slack and others, to improve the organization's productivity, collaboration and business application workloads. Organizations wish to monitor the employees' actions performed via each application. In many cases, organizations have a large number of applications, for example organizations that have dozens of departments are likely to use thousands of applications. In each application, the process of integrating the application to the organization is time consuming, and may take several days to configure all the relevant fields and download the relevant information. When multiplied by hundreds, this process results in high costs and delays the effective usage of the organization in these applications. There is thus a need to provide a computerized platform and processes to enable fast integration of applications operating in the organization.

SUMMARY

In one embodiment a method is provided for integrating an organization into a computer application, the method comprising generating jobs to request data from the application servers according to an integration plan for the computer application; assigning queue IDs to jobs required to be performed as part of the integration plan, where each queue ID of the queue IDs is associated with multiple jobs that share a limitation of the application's servers executing the jobs at the relevant queue, executing the jobs in the integration plan in queues according to the queue IDs, updating jobs to a time-dependent list, where the update comprises adding and removing jobs.

In some cases, the method further comprises incrementing a job counter after execution of the job and checking whether or not the counter exceeds a limitation of the application's servers.

In some cases, executing the job comprises sending a message to the application's servers, the message comprising an input specific to the job, and receiving the data field from the application's servers. In some cases, the jobs are removed from the list according to a "time-to-live" parameter that is based on the limitation.

In some cases, the method further comprises generating subsequent jobs based on data received from app servers. In some cases, the subsequent job is created according to an extraction plan, where the subsequent job includes data received in a prior job.

In some cases, each application requires a specific set of actions to complete the integration. In some cases, the set of actions includes the types of information required to be received from the application's servers in order to integrate the application.

In some cases, the method further comprises the extractor receiving a new application, the extractor sending requests to the new application's server for information, the extractor receives feedback from the new application's server, the extractor generates a limit rule for the new application's server based on requests.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

At least some implementations described herein address the technical problem of integrating SaaS applications being used in an organization. The integration involves requesting many data fields, understanding the protocols used in each SaaS application (or just application), the technical limitations imposed by the application's owner on organizations wishing to extract information from the application's servers and the like. The technical problem becomes more challenging in case a single entity is used by multiple organizations to integrate the information from the applications. For example, such single entity is a monitoring server configured to monitor the activities of multiple organizations and the entities in these organizations. For example, the monitoring server serves 50 organizations that use a total of 2,000 applications, with dozens of new applications required to be monitored on a weekly basis. There is a need to automate the process of integrating new applications in order to reduce the time required until the organization can start using the application. The integration involves configuring values in the devices used by the organization as well as extracting a lot of information from the application's servers.

The technical solution is a computing system and method configured to integrate applications to organizations. The computing system comprises a data extractor coupled to servers (for example devices or machines) that store the data required for the organization to begin using the application. The data extractor has access to rules that limit the amount and rate of data that can be extracted from the servers. The data extractor may be coupled to a plurality of queues, each queue receives one or more extraction jobs, each job is defined as a request for data from the server. The data extractor is implemented as a narrow layer that can be generated for each new application, such that only the extraction rules and limitations differ from one application to another.

Figure 1:
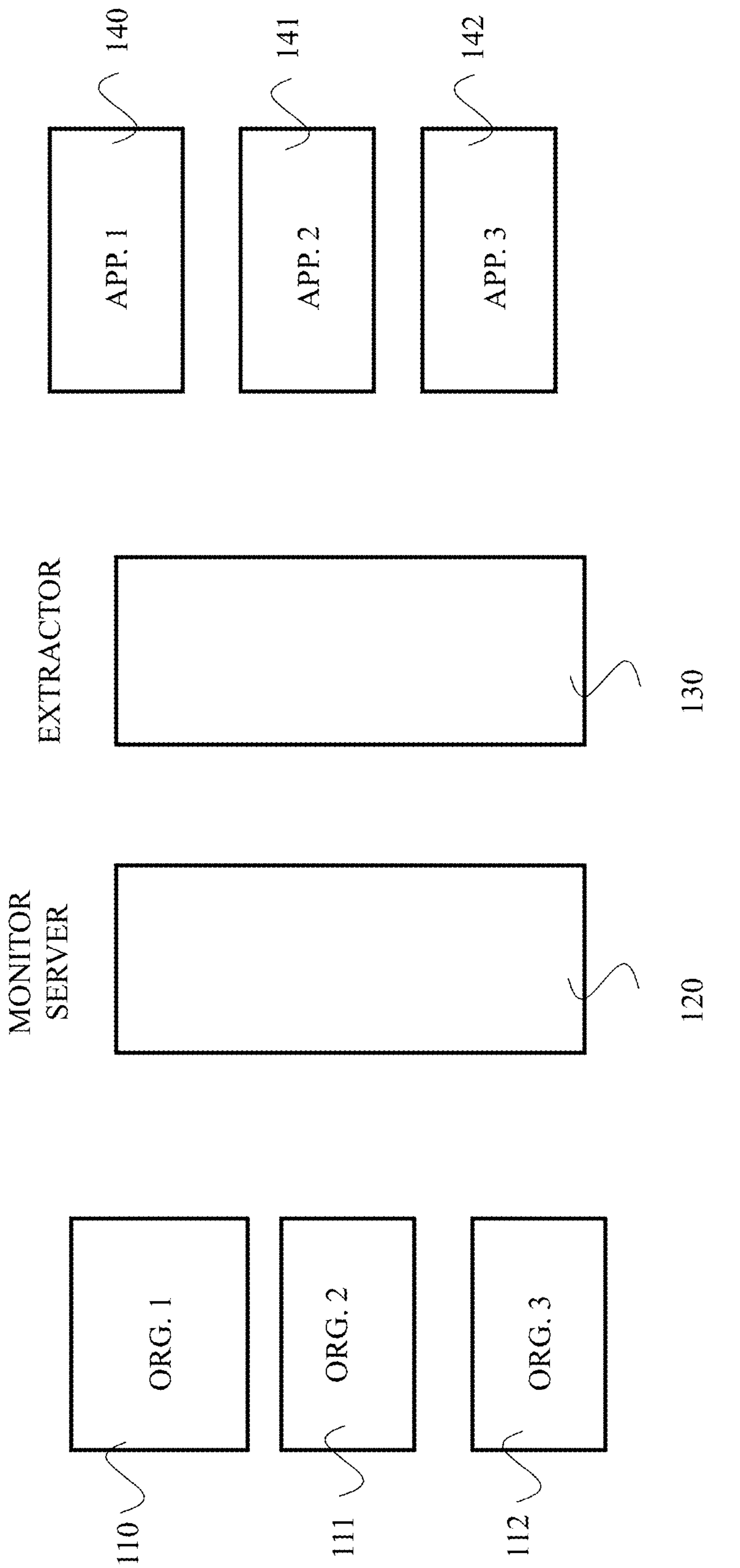
FIG. 1 shows a computerized environment having different parties that take part in a process for integrating software services used in an organization, in accordance with some embodiments of the invention.

FIG. 1 shows a computerized environment having different parties that take part in a process for integrating software services used in an organization, in accordance with some embodiments of the invention. The computerized environment comprises multiple organizations 110, 111, 112 that use applications. The organizations 110, 111, 112 use the applications via entities, such as users, virtual machines and services. The organizations 110, 111, 112 may be businesses, government units, educational institutions, non-profit organizations and the like.

The applications 140, 141, 142 may be software components operating on electronic devices of the organizations, or virtual machines, or servers. The applications 140, 141, 142 may be SaaS applications, internet applications, applications installed on-premise, or both. The applications 140, 141, 142 send data to devices or machines used by the organizations 110, 111, 112 in order for the organizations 110, 111, 112 to begin using the applications 140, 141, 142 or to monitor the usage of the applications 140, 141, 142 by entities of the organizations 110, 111, 112. The information may be event logs, permissions, rules and the like. The information may vary from one entity to another.

The computerized environment shows a monitoring server 120 configured to monitor the activities of the entities in the organizations 110, 111, 112 via the applications 140, 141, 142. The organizations 110, 111, 112 provide the monitoring server 120 with permissions to access data stored in the servers operated by the applications 140, 141, 142. The monitoring server 120 uses the extractor 130, also defined hereafter as data extractor, as a component used to extract information from the applications 140, 141, 142. In some cases, the monitoring server 120 may be coupled to multiple data extractors, one data extractor 130 for each application.

Figure 2:
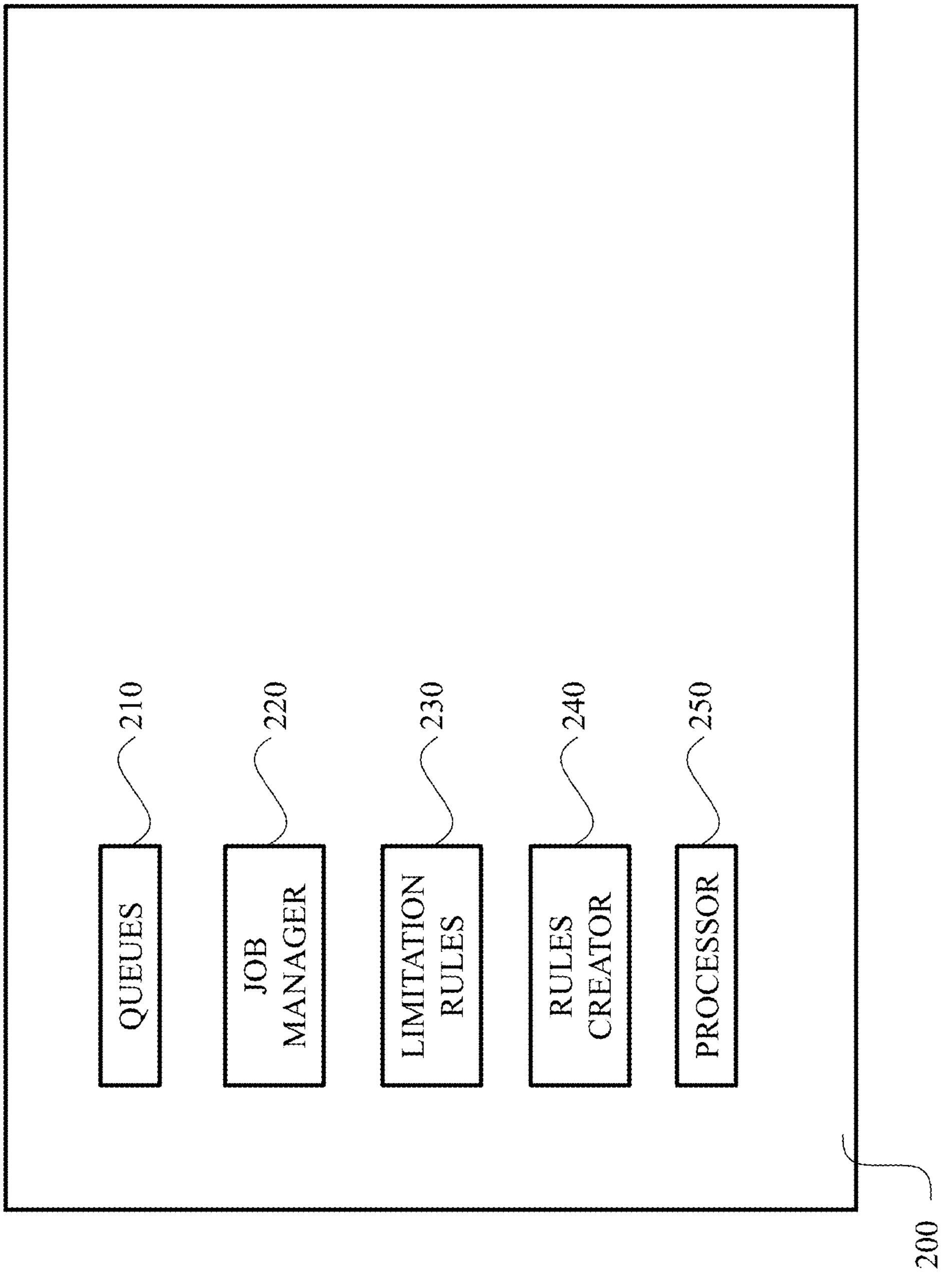
FIG. 2 shows a computing system for integrating software services used in an organization, in accordance with some embodiments of the invention.

FIG. 2 shows a computing system for integrating software services used in an organization, in accordance with some embodiments of the invention. In various embodiments, the computing system described above performs a specific process for integrating software services used in organizations The computing system 200 comprises a processor 250 configured to manage the processes described herein. Processor 250 may be any one or more processors such as a Central Processing Unit (CPU), a microprocessor, an electronic circuit, an Integrated Circuit (IC), or the like. Processor 250 may be utilized to perform computations required by the apparatus or any of its subcomponents.

The computing system 200 may also comprise a rate rules storage 230 configured to store rules concerning data limitations of a specific application or a specific application server in case the specific application stores data in multiple servers. The rate rules storage 230 may be a hard disk drive, a Flash disk, a Random Access Memory (RAM), a memory chip, or the like. The rules in the rate rules storage 230 may be updated when detecting updates at a memory address of the servers, or according to rules created or identified by rules creator 240. The rules creator 240 may be a software model that receives feedbacks from the servers to data requests and creates data limitation rules for a specific server according to the feedback. For example, server #12 allows maximum of 120 data requests concurrently, or 500 requests concerning a specific user during a given time of 60 minutes, or a total of 2000 requests per day. The data requests may be sent via an API of the servers/applications, via Web-hooks or another technique or protocol desired by a person skilled in the art.

The computing system 200 may also comprise a job manager 220 configured to manage the jobs among the queues 210. In some cases, each queue is related uniquely to a single user of the application. For example, the organization has 5,000 users and wishes to extract data uniquely to each user, for example, according to each user's permissions and business tasks. The job manager 220 receives jobs to be handled and assigns the jobs to the relevant queue among the queues 210. The job manager 220 may use the processor 250.

Figure 3:
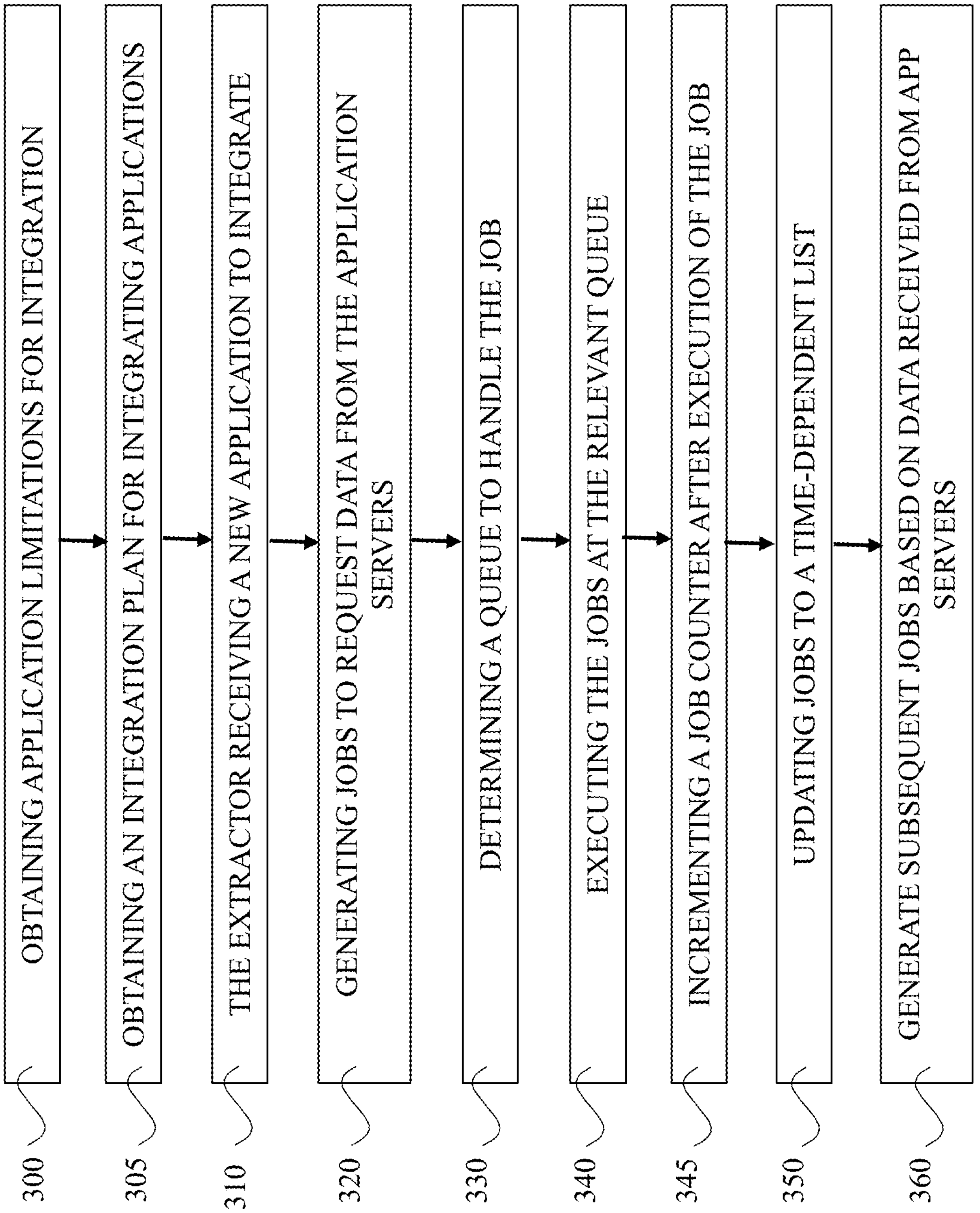
FIG. 3 shows a flowchart of a method of integrating software services used in an organization, in accordance with some embodiments of the invention.

FIG. 3 shows a flowchart of a method of integrating software services used in an organization, in accordance with some embodiments of the invention.

Step 300 discloses obtaining application limitations for integration. The limitations are dictated by the applications integrated to the organizations such that the same limitations are applied to different organizations wishing to integrate the same application. The limitations are stored in a database or in another form of a computer memory accessible to the machine that performs the processes described herein.

The limitations may be time-based, for example, "provide a maximal number of items of type #3 during a single hour", or concurrency-based, for example, "serve a maximum 100 threads concurrently". The limitations differ from one application to another but apply equally to all organizations. This way, when an organization wishes to integrate into a specific application, the machine already obtains the limitations of the specific application and the difference is the organization's properties, such as number of users, users' types, permissions, and the like.

Step 305 discloses obtaining an integration plan for integrating applications. Each application requires a specific set of actions to complete the integration. The set of actions includes the types of information required to be received from the application's servers in order to integrate the application, for example, users' identifiers or names, groups of users in the organization that use the application as a group, permissions of various users, and the like. The set of actions includes relations among actions, for example, "perform task #104 only after task #42", "use the data field received during task #33 as input to the data requested in task #62" and the like. The tasks are also defined as jobs, as each job may be defined as a request for a single data item, for example, a name of user #255.

Step 310 discloses the extractor receiving a new application to integrate. The request comprises an identifier of the new application, for example, a URL or a name of the application. The request may include an integration type, for example, "basic", "full" and the like. The request may include a list comprising the relevant information required from the organization in order to integrate the new application, for example, the number of users, user types, groups, permissions, and the like.

Step 320 discloses generating jobs to request data from the application servers. A job may be defined as extracting a specific data field from the application servers. For example, permissions of standard users in the new application, the jobs are defined according to the information specific to the organization that issued the request received by the extractor and the plan for the specific application. that is, a different set of jobs may be generated for two different organizations when integrating with the same application, depending on the number of users in each organization, type of users, security requirements, permissions, different application capabilities required by each organization, and the like. The set of jobs includes job types, number of jobs, and relations between jobs, as defined above.

Step 330 discloses determining a queue to handle the job. The system assigns a queue ID for each job. The queue ID is associated with multiple jobs that share a limitation of the application's servers. For example, one type of job is to extract users while another type of job is to bring a group of events. Each type shares a limitation from the application servers. For example, the limitation is that an organization can receive 5 concurrent calls per user. In such a case, all the jobs related to the limitation are assigned the same queue ID. Then, the jobs with the same queue ID are sent to the same queue or to different queues that execute jobs with the specific queue ID. In some cases, the queues have multiple threads, allowing them to execute multiple jobs concurrently. The number of threads in a queue may be limited according to the application limitation for the jobs executed by the queue. For example, in case the limitation is for 5 concurrent jobs, the queue may have 5 threads in order to execute the 5 concurrent jobs. In case the limitation is for 100 jobs per hour and no limitations on the number of concurrent jobs, the queue may have 100 threads.

Step 340 discloses executing the jobs at the relevant queue. The execution comprises sending a message to the application's servers, for example with an input specific to the job, receiving the data field from the application's servers, storing the data field, or sending the data field to a predefined entity, such as a server or database, and sending a feedback that the job is done and the thread is ready to receive another job. The data field may comprise activity/audit logs, API call responses, file/record content, metadata, and the like.

Step 345 discloses incrementing a job counter after execution of the job. After one or more increments, the system checks whether or not the counter exceeds a limitation of the application's servers. In some cases, the system stores multiple counters, according to the number of limitations. For example, when performing a job in a type limited to 100 jobs per hour, the counter is incremented by 1, to verify that the queues can receive additional jobs of the same type.

Step 350 discloses updating jobs to a time-dependent list. The update comprises adding and removing jobs. The jobs are removed according to a "time-to-live" parameter that is based on the limitation. For example, the list contains all the jobs added in the past 2 hours, in case the limitation dictates a maximal number of jobs per 2 hours. In case the list reaches the maximal value, jobs cannot be executed until other jobs are removed from the list, for example, 2 hours after the execution of the job.

Step 360 discloses generate subsequent jobs based on data received from app servers. For example, a job can be "extract groups"-all the groups in the organization that use the application as a group. The subsequent job is created according to an extraction plan. The subsequent job includes data received in the prior job, for example, a user identifier or a group identifier.

Figure 4:
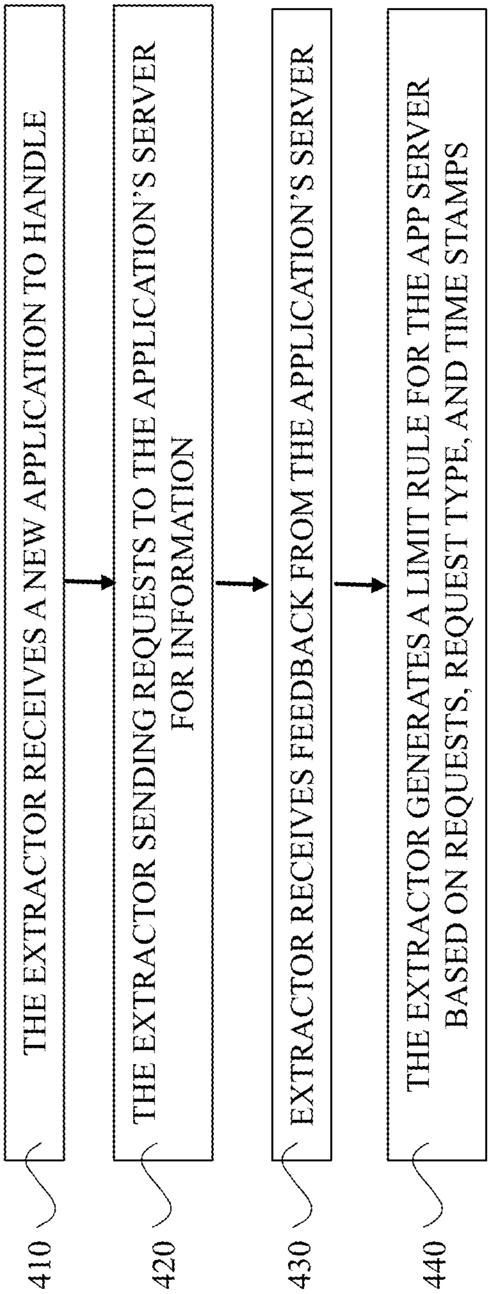
FIG. 4 shows a flowchart of a method of generating limitation rules for application servers, in accordance with some embodiments of the invention.

FIG. 4 shows a flowchart of a method of generating limitation rules for application servers, in accordance with some embodiments of the invention.

Step 410 discloses the extractor receives a new application to integrate. The new application is defined as an application that was not integrated by the extractor to an organization or was not integrated within a predefined time period. The extractor cannot access limitations of the application's servers, for example, a maximal number of concurrent jobs, maximal jobs per hour, and the like.

Step 420 discloses the extractor sending requests to the application's server for information. The number and/or rate of the requests may increase according to the feedback. For example, in an initial time period the extractor sends 15 requests of type A per minute and 5 requests of type B per minute. If all requests are approved, the extractor increases the request rate according to a plan.

Step 430 discloses extractor receives feedback from the application's server. The feedback may be approved or declined. The feedback may be the receipt of the requested information. The extractor may create a list of feedbacks and input the list of feedbacks to a software model configured to create limitation rules. The limitation rules define a number of jobs that can be approved by a specific application server in a given time frame or concurrently. The jobs may be specific of type, for example "rule #42 applies only on jobs of type #12".

Step 440 discloses the extractor generates a limit rule for the app server based on requests, request type, and time stamp. The rules may be generated by a model, for example a large learning model having at least one million parameters.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant files and/or records will be developed and the scope of the term file and/or record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the invention.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the invention. To the extent that section headings are used, they should not be construed as necessarily limiting. In addition, any priority document(s) of this application is/are hereby incorporated herein by reference in its/their entirety.

What is claimed is:

1. A method for integrating an organization into a computer application, the method comprising:

generating a plurality of jobs to request data from a plurality of servers of the computer application according to an integration plan for the computer application;

assigning queue IDs to the plurality of jobs, wherein each queue ID of the queue IDs is associated with multiple jobs of the plurality of jobs, wherein the multiple jobs each share a limitation of one of the servers of the plurality of servers;

obtaining time-dependent lists that define a number of jobs of a given job type executable within a time duration according to limitations of the plurality of servers, wherein the limitations define an amount of data can be extracted from the plurality of servers in a given time frame or concurrently;

executing the plurality of jobs in queues according to the queue IDs;

after executing a job of the plurality of jobs, incrementing a counter corresponding to a list of the time-dependent lists, wherein the counter is associated with a limitation according to the job type and a respective limitation of the particular servers of the plurality of servers that executed the job;

wherein the plurality of jobs include extracting a specific data field from the plurality of servers;

wherein the job type defines a plurality of jobs having mutual limitations of one of the servers of the plurality of servers;

verifying that the queues can receive more jobs based on the counter being below the limitation according to the job type and the respective limitation of the particular servers of the plurality of servers that executed the job;

after a predefined time from execution of the job, decrementing the counter of the list; and generating a second plurality of jobs based on data received from a respective server of the plurality of servers used in a previously executed job, wherein the second plurality of jobs includes data received from the respective server during execution of the previously executed job;

adding and removing jobs to the time-dependent lists according to a maximal value of jobs per the time duration as defined in the limitations of the plurality of servers.

2. The method of claim 1, wherein executing the job comprises sending a message to the application's servers, wherein the message comprises an input specific to the job, and receiving the data field from the application's servers.

3. The method of claim 1, wherein the jobs are removed from the list according to a "time-to-live" parameter that is based on the limitation.

4. The method of claim 1, further comprising generate subsequent jobs based on data received from app servers.

5. The method of claim 4, wherein the subsequent job is created according to an extraction plan; wherein the subsequent job includes data received in a prior job.

6. The method of claim 1, wherein each application requires a specific set of actions to complete the integration.

7. The method of claim 6, wherein the set of actions includes the types of information required to be received from the application's servers in order to integrate the application.

8. The method of claim 1, further comprising:

an extractor receives a new application;

the extractor sending requests to the new application's server for information;

the extractor receives feedback from the new application's server;

the extractor generates a limit rule for the new application's server based on requests.

* * * * *